United States Patent [19]

Ozawa et al.

[11] Patent Number: 5,357,091
[45] Date of Patent: Oct. 18, 1994

[54] CARD TYPE INPUT/OUTPUT INTERFACE DEVICE AND ELECTRONIC DEVICE SYSTEM USING THE SAME

[75] Inventors: Masayuki Ozawa; Shigeru Suzuki, both of Kawasaki, Japan

[73] Assignee: Fujitsu Limited, Kawasaki, Japan

[21] Appl. No.: 875,800

[22] Filed: Apr. 30, 1992

[30] Foreign Application Priority Data

Apr. 30, 1991 [JP] Japan .................. 3-124635

[51] Int. Cl.⁵ .............................................. G06K 5/00
[52] U.S. Cl. ...................... 235/380; 395/200
[58] Field of Search ................. 235/380; 395/200, 325

[56] References Cited

U.S. PATENT DOCUMENTS

| | | | |
|---|---|---|---|
| 4,985,921 | 1/1991 | Schwartz | 235/380 |
| 5,149,945 | 9/1992 | Johnson et al. | 235/380 |
| 5,157,247 | 10/1992 | Takahira | 235/380 |
| 5,175,818 | 12/1992 | Kunimoto et al. | 395/200 |
| 5,212,369 | 5/1993 | Karlisch et al. | 235/380 |
| 5,239,165 | 8/1993 | Novak | 235/380 |
| 5,241,160 | 8/1993 | Bashan et al. | 235/380 |
| 5,249,270 | 9/1993 | Stewart et al. | 395/200 |

*Primary Examiner*—Raymond A. Nelli

[57] ABSTRACT

A card type input/output interface device includes a first connection part for transferring data between a main body of an electronic device and the card type input/output interface device, a second connection part which is coupled to the first connection part and transfers data between an external device and the card type input/output interface device, and a card supporting the first and second connection part. The first connection part is accommodated in the main body when the card type input/output interface device is inserted into a slot provided in the main body.

37 Claims, 11 Drawing Sheets

CARD TYPE INPUT/OUTPUT INTERFACE DEVICE AND ELECTRONIC DEVICE SYSTEM USING THE SAME

BACKGROUND OF THE INVENTION

1. Field of the Invention

The present invention generally relates to a card type input/output interface device, which couples a main body of an electronic device system and an external or peripheral device with each other.

2. Description of the Prior Art

As is well known, advances in the semiconductor technology bring about down-sizing of various electronic device systems. An IC (Integrated Circuit) memory card was created under the above circumstances. An IC memory card, which functions as an external storage device, is inserted into a slot of the main body of an electronic device system. Normally, a small-scale electronic device system, such as a laptop computer, has a connector for connecting it to external devices such as a printing machine and a modem. There is currently a need for further down-sizing and for cost reducing of such electronic device systems.

An IC memory card comprises integrated volatile memories and/or integrated nonvolatile memories mounted on a card. Examples of the integrated volatile memories are an SRAM (Static Random Access Memory) or a DRAM (Dynamic Random Access MemOry), and examples of the integrated non-volatile memory are a mask ROM (Read Only Memory) and an EEPROM (Electrically Erasable Programmable Read Only Memory). If 12 IC memories, each having a storage capacity of 64 kbits, are mounted on a card, an IC memory card having a storage capacity of 768 kbits will be formed. Hence, it is easy to form an IC memory card having a storage capacity of a few megabits to tens of megabits by mounting, on the card, a plurality of IC memories, each memory having a storage capacity of few megabits on a chip. An IC card has been practically used in which a processor is formed integrally with IC memories. Such an IC card has the function of processing data. This IC card is also called a smart card or an intelligent card.

The external dimensions of IC memory cards or IC cards are 85.6×54.0×3.3 [mm], for example. These cards are inserted into slots of electronic device systems, such as word processors and personal computers. In the state where the cards are inserted into the slots, the cards make electric connections with internal buses or registers provided in the electronic device systems. These electric connections can be made by means of direct contact structures or non-contact structures.

Nowadays, small-scale electronic device systems use IC memory cards as replaceable external storage devices. Further, external or peripheral electronic device systems which are not always used together with the main body are electrically connected to the main body via a connector formed on, for example, a sidewall(s) of the main body. The use of the above connector mounted on the sidewall of the main body prevents down-sizing of electronic device systems.

SUMMARY OF THE INVENTION

It is a general object of the present invention to provide a card type input/output interface device in which the above disadvantages are eliminated.

A more specific object of the present invention is to facilitate down-sizing of the main body of an electronic device system by means of a card type input/output interface device, which is inserted into a slot formed in the main body.

The above objects of the present invention are achieved by a card type input/output interface device comprising: first connection means for transferring data between a main body of an electronic device and the card type input/output interface device; second connection means, coupled to the first connection means, for transferring data between an external device and the card type input/output interface device; and a card supporting the first and second connection means. The first connection means is accommodated in the main body when the card type input/output interface device is inserted into a slot provided in the main body.

Another object of the present invention is to provide an electronic device system using the above card type input/output interface device.

This object of the present invention is achieved by an electronic device system comprising: a main body of the electronic device system, the main body comprising a slot; a card type input/output interface device inserted into the slot; and an external device. The card type input/output interface device comprises: first connection means for transferring data between the main body and the card type input/output interface device; second connection means, coupled to the first connection means, for transferring data between an external device and the card type input/output interface device; and a card supporting the first and second connection means, the first connection means being accommodated in the main body when the card type input/output interface device is inserted into the slot provided in the main body. The main body comprises third connection means, coupled to the first connection means, for coupling the main body and the card type input/output interface device with each other. The external device comprises fourth connection means, coupled to the second connection means, for coupling the card type input/output interface device and the external device with each other.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
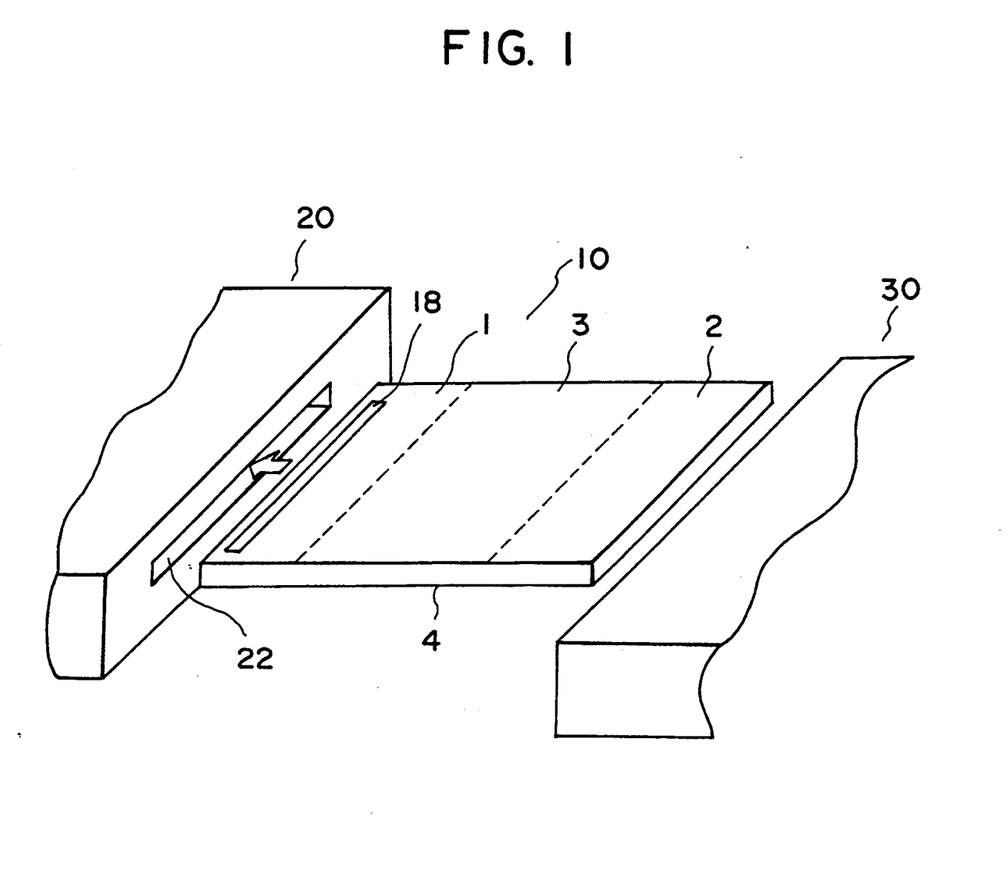
FIG. 1 is a perspective view of a first embodiment of the present invention.

Referring to FIG. 1, a card type input/output interface device 10 according to a first embodiment of the present invention comprises a card 4, a first connection part 1, a second connection part 2 and a circuit part 3. The first and second connection parts 1 and 2, and the circuit part 3 are supported by the card 4. The first connection part 1 is located on a first end portion of the card 4, the first end portion being inserted into a slot 22 formed on a sidewall of a main body 20 of an electronic device system. The second connection part 2 is located on a second end portion of the card 4, which is opposite the first connection part 1o The circuit part 3 is interposed between the first connection part 1 and the second connection part 2.

Figure 2A:
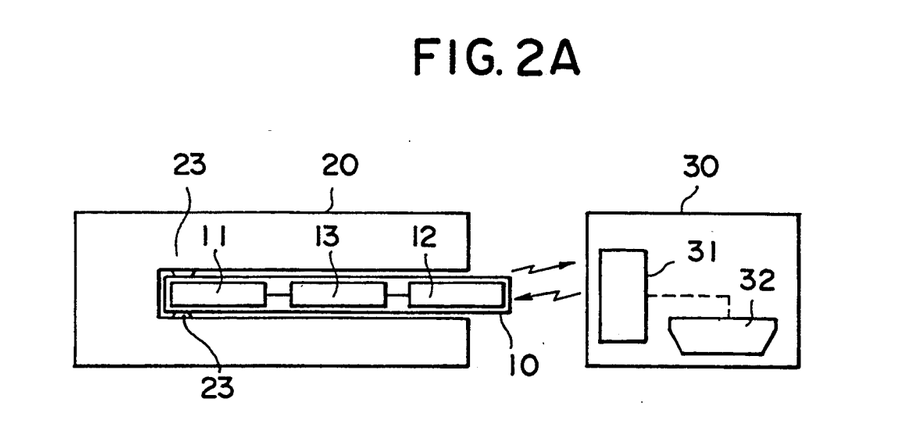
FIGS. 2A and 2B are block diagrams of the first embodiment of the present invention in more detail.

The connection part 1 comprises a connector 18 formed on a single side or both opposing sides of the card 4, as in the case of conventional IC cards. In the state where the interface device 10 has been inserted into the slot 22 of the main body 20, the connector 18 comes into contact with a connector 23 in the slot 22 of the main body 20, as shown in FIG. 2A. Signals are transferred between the main body 20 and the interface device 10 via the connectors 18 and 23.

The connection part 2 comprises a radio transmitter/receiver unit and an antenna. The antenna is, for example, a rot antenna, as will be described in detail. Signals are transferred between the interface card 10 and an external or peripheral device 30 through a radio communications channel. For this purpose, the external device 30 comprises an antenna and a radio transmitter/receiver unit, as will be described later.

The circuit part 3 comprises an antenna and a data transfer unit, as will be described in detail later. It is necessary to place the main body 20 and the external device 30 within service areas of the interface device 10 and the external device 30.

Figure 2B:
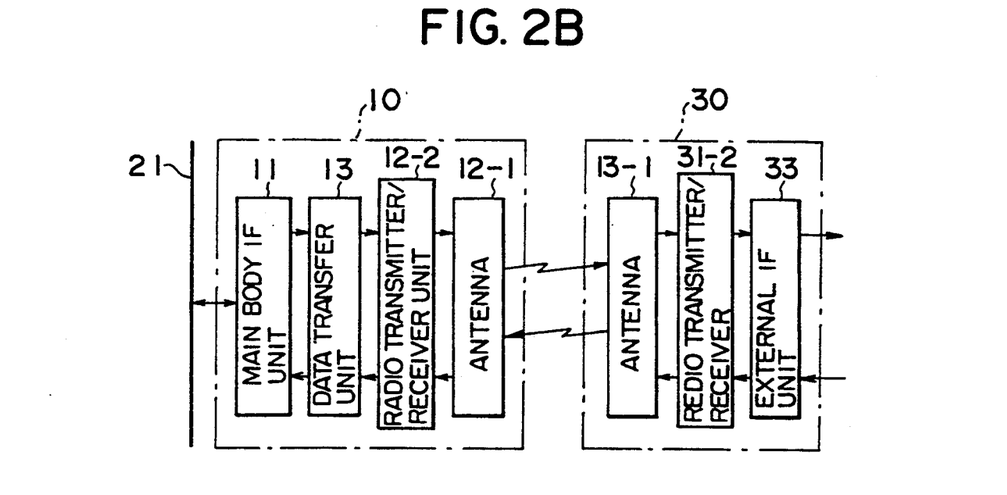

FIGS. 2A and 2B show the configuration of the first embodiment of the present invention in more detail. In FIGS. 2A and 2B, those parts which are the same as those shown in FIG. 1 are given the same reference numerals. A main body interface unit 11, which comprises the connector 18, is formed on the first contact part 1 shown in FIG. 1. An antenna 12-1 and a radio transmitter/receiver unit 12-2 are formed in the second connection part 2 shown in FIG. 1. A data transfer unit 13 is formed in the circuit part 3 shown in FIG. 1.

The aforementioned connector 23, which is electrically connected to a bus of the main body 20, has parts mounted on upper and lower inner surfaces defining the slot 22.

The external device 30, such as a printing machine or a modem, comprises a radio communications part 31 and a connector unit 32. The radio communications part 31 functions to communicate with the interface device 10 via a radio communications channel. The connector unit 32 is provided for connecting the external device 30 to another external device. The radio communications part 31 comprises an antenna 31-1 and a radio transmitter/receiver unit 31-2. The connector unit 32 comprises an external interface unit 33 comprising a connector.

Figure 3A:
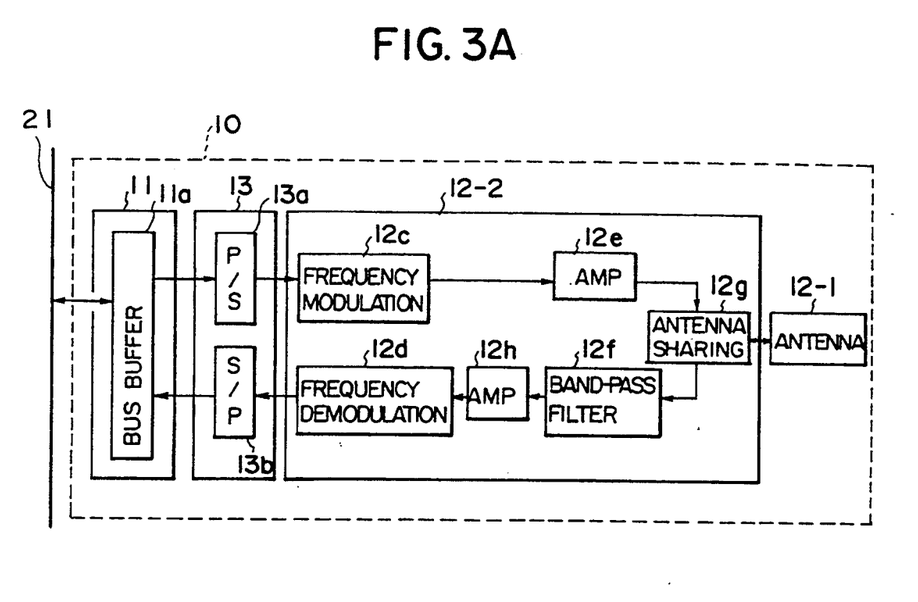
FIG. 3A is a block diagram of a card type input/output interface device shown in FIGS. 2A and 2B.

FIG. 3A shows the configuration of the interface device 10 in more detail. The main body interface unit 11 comprises a bus buffer 11a, which is electrically connected to the bus 21 via the connectors 18 and 23 (these connectors are omitted in FIG. 3A for the sake of simplicity). The data transfer unit 13 comprises a parallel-to-serial (P/S) converter 13a and a serial-to-parallel (S/P) converter 13b. Data from the bus buffer 11a is transferred in parallel form. The P/S converter 13a converts parallel data from the bus buffer 11a into serial data. The S/P converter 13b converts serial data from the radio transmitter/receiver unit 12-2.

The radio transmitter/receiver unit 12-2 comprises a frequency modulator 12c, a frequency demodulator 12d, amplifiers 12e and 12h, a band-pass filter 12f and an antenna sharing device 12g. The frequency modulator 12c modulates digital data into a frequency signal transmittable via a radio communications channel. The frequency demodulator 12d demodulates a frequency signal received from a radio communications channel into digital data. The amplifier 12e amplifies the frequency signal from the frequency modulator 12c, and the amplifier 12h amplifiers the frequency signal received. The bandpass filter 12f extracts signal components in a reception frequency band from the received frequency signal. The amplifiers 12e and 12f are coupled to the antenna 12-1 via the antenna sharing device 12g.

Figure 3B:
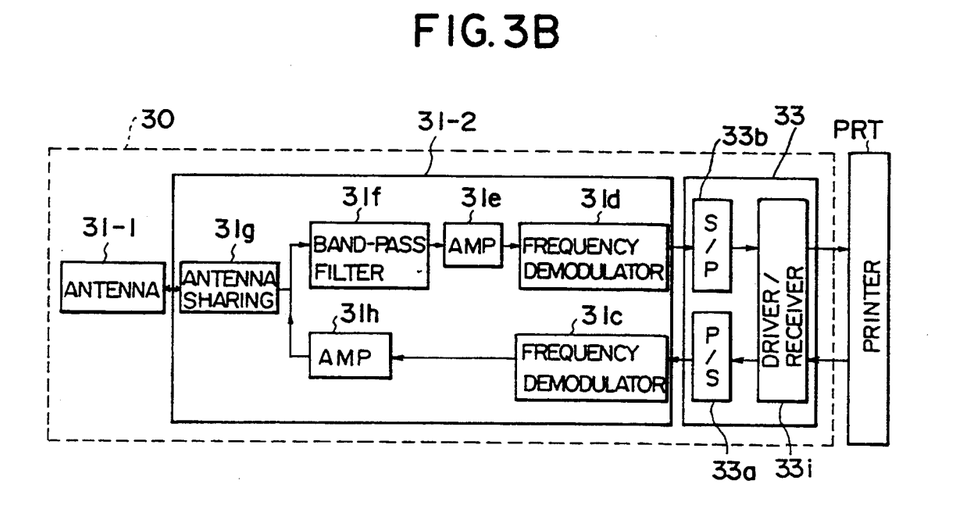
FIG. 3B is a block diagram of an external device shown in FIGS. 2A and 2B.

FIG. 3B shows the configuration of the external device 30. The radio transmitter/receiver unit 31-2 comprises an antenna sharing device 31g, a band-pass filter 31f, amplifiers 31e and 31h, a frequency demodulator 31d and a frequency modulator 31c. These structural elements of the radio transmitter/receiver unit 31-2 are the same as those in the radio transmitter/receiver unit 12-2 of the interface device 10. The external interface unit 33 of the external device 30 comprises an S/P converter 33b, a P/S converter 33a and a driver/receiver 33i. The driver/receiver 33i outputs drive signals to a printer PRT, and receives signals from the printer PRT.

The modulation type used in the first embodiment is, for example, a sub-carrier MSK method, or a FSK method. It is possible to selectively use a plurality of radio communications channels as in the case of automobile telephones and portable telephones. For example, if there is much noise in a radio communications channel, another radio communications channel will be selected. The above switching can be made if a radio communications channel interferes another device. An arbitrary frequency of the radio channel can be used. In Japan, it is preferable that the frequency of the radio channel be within a 380 MHz/250 MHz range.

Figure 4A:
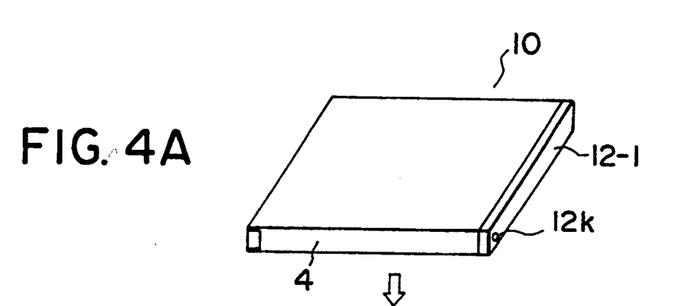
FIGS. 4A through 4D are diagrams showing an antenna used in disclosed embodiments of the present invention.
Figures 4B, 4C:
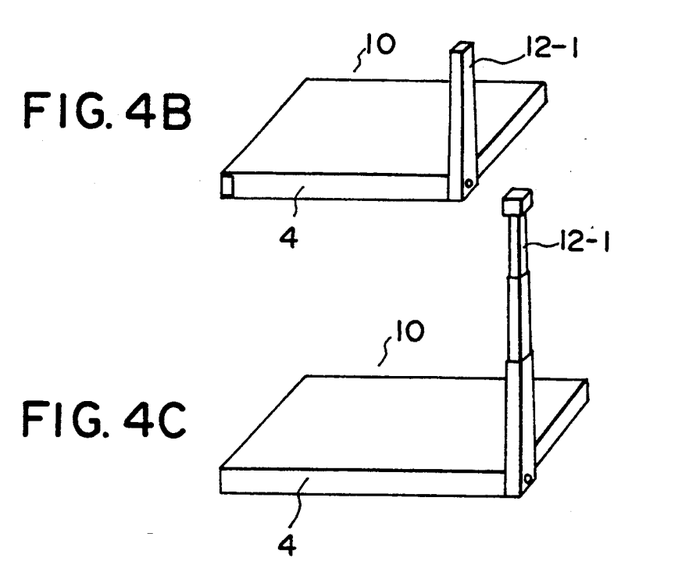
Figure 4D:
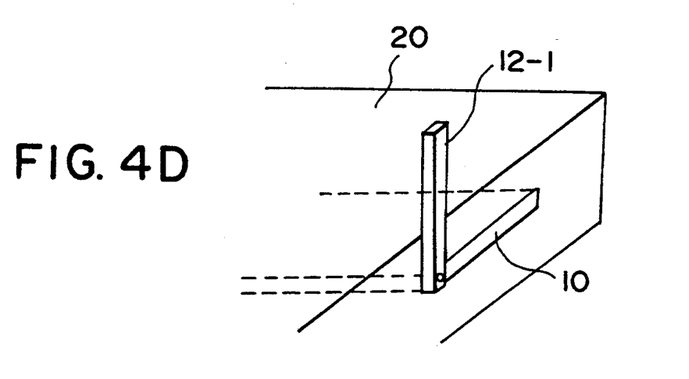

FIGS. 4A through 4D show the antenna 12-1. The antenna 12-1 shown in FIG. 4A is a rod antenna, which is rotatably supported by a screw member 12k. That is, the screw member 12k is fastened to the sidewall of the card 4 so that the rod antenna 12-1 rotates around the screw member 12k. The rod antenna 12-1 is contractible and expandable. FIG. 4A shows the contracted state of the rod antenna 12-1. When the rod antenna 12-1 is used, it is made stand upright, as shown in FIG. 4B. Then, the rod antenna 12-1 is expanded so that it has an elongated length, as shown in FIG. 4C. FIG. 4D shows the state where the interface device 10 has been inserted into the slot 22 of the main body 20. The antenna 12-1 is not limited to the rod type, but instead another type of antenna can be used. For example, the antenna 12-1 can be a conductive pattern formed on the card.

When a processor (not shown) in the main body 20 or the like specifies the external device 30 and generates an instruction to transfer data, the data transfer unit 13 of the interface device 10 receives parallel data on the bus 21 via the main body interface unit 11, and converts the parallel data into serial data. The radio transmitter/receiver unit 12-2 modulates the serial data in the predetermined modulation method, and transmits the frequency signal via the antenna 12-1. The external device receives the frequency signal via the antenna 31-1, and demodulates it into serial data. The serial data is converted into parallel data by the external interface unit 33. Further, the external interface unit 33 generates the drive signals from the parallel data, and applies the signals to the printer PRT.

When data is transferred from the external device 30 to the main body 20, serial data applied to the radio transmitter/receiver unit 31-2 via the external interface unit 33 is modulated and transmitted via the antenna 31-1. The radio transmitter/receiver unit 12-2 of the interface device 10 receives the frequency signal from the external device 30 via the antenna 12-1. The serial data output from the radio transmitter/receiver unit 12-2 is converted into parallel data by the data transfer unit 13, and output to the bus 21 via the main body interface unit 11.

The external device 30 has the connector unit 32. Thus, it is possible to transfer data received from the interface device 10 to another external device via the connector unit 32 and transfer data received from another external device to the interface device 10. The connector unit 32 conforms to, for example, the RS-232C interface. It should be noted that the main body 10 can be connected to an external device via the interface device 10 and the external device 30 as if the main body 10 is connected thereto through the connector attached to the main body 10. Hence, it becomes possible to omit the conventional connector(s) provided in the main body 20.

Figure 5:
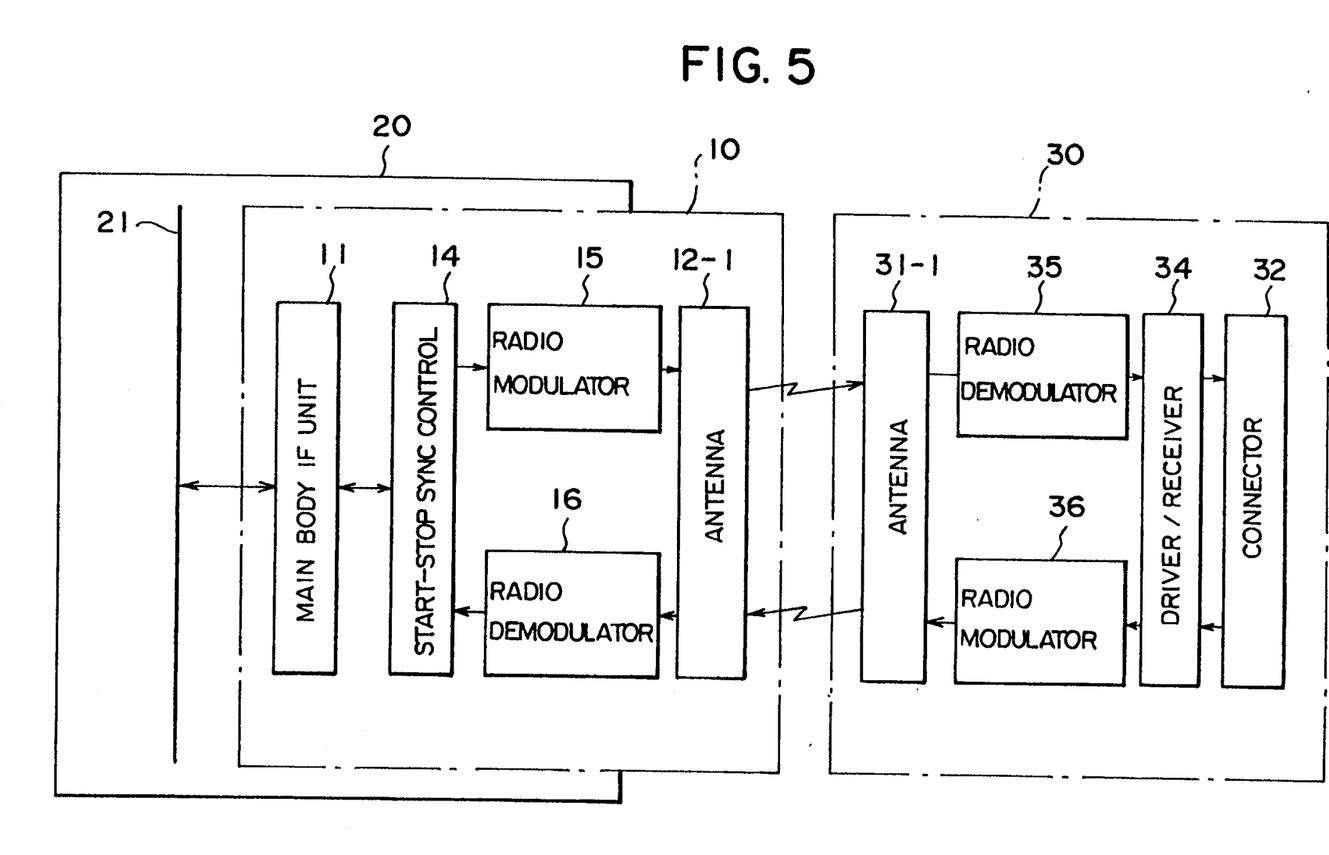
FIG. 5 is a block diagram of a second embodiment of the present invention.

FIG. 5 shows the configuration of a second embodiment of the present invention. In FIG. 5, those parts which are the same as those shown in the previously described figures are given the same reference numerals. The second embodiment of the present invention uses a start-stop system communications method. The radio transmitter/receiver unit 12-2 and the data transfer unit 13 of the interface device 10 shown in FIG. 2B are replaced by a start-stop synchronization controller 14, a radio modulator 15 and a radio demodulator 16. The radio transmitter/receiver unit 31-2 and the external interface unit 33 of the external device 30 shown in FIG. 2B are replaced by a connector 32, a driver/receiver 34, a radio demodulator 35 and a radio modulator 36.

Figure 6A:
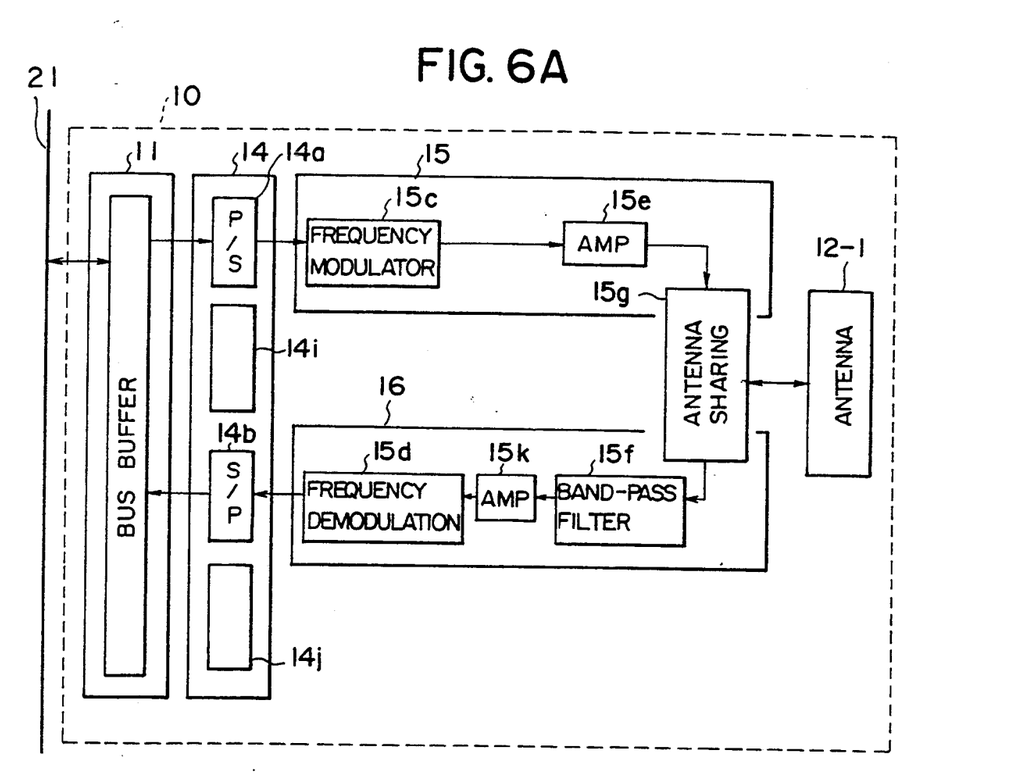
FIG. 6A is a block diagram of the card type input/output interface device used in the second embodiment of the present invention.

FIG. 6A shows the configuration of the interface device 10 according to the second embodiment of the present invention. The start-stop synchronization control unit 14 comprises a P/S converter 14a, a S/P converter 14b, a parity generator 14i, and a parity checker 14j. The parity generator 14i generates a parity bit in the start-stop synchronization and adds it to data to be transmitted. The parity checker 14j checks the parity check in data received from the external device 30. The radio modulator 15 comprises a frequency modulator 15c, an amplifier 15e and an antenna sharing device 15g. The radio demodulator 16 comprises the antenna sharing device 15g, a band-pass filter 15f, an amplifier 15k and a frequency demodulator 15d.

Figure 6B:
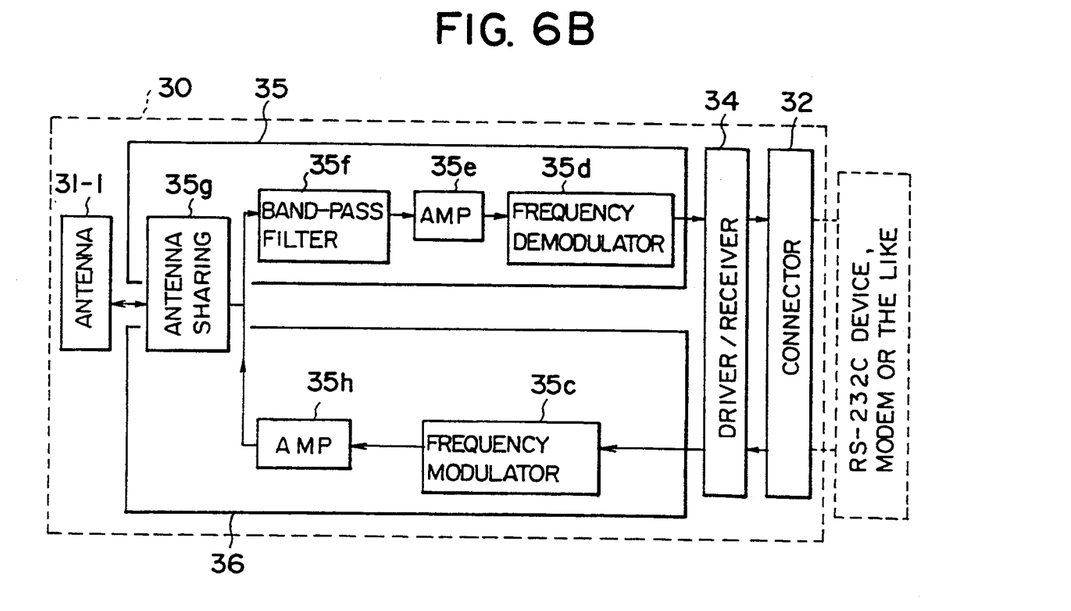
FIG. 6B is a block diagram of an external device used in the second embodiment of the present invention.

FIG. 6B shows the configuration of the interface device 30 according to the second embodiment 35 of the present invention. The radio demodulator comprises an antenna sharing device 35g, a band-pass filter 35f, an amplifier 35e and a frequency demodulator 35d. The radio modulator 36 comprises the antenna sharing device 35g, an amplifier 35k.

The interface device 10 is inserted into the slot 22 of the main body 20 in the same manner as the interface device 10 of the first embodiment of the present invention. The interface device 10 is connected to the bus 21 via the main body interface unit 11. The external device 30 is positioned within the service areas of the interface device 10 and the external device 30. Another external device, such as a modem, is connected to the external device 30 via the connector 32.

The processor in the main body 20 or the like specifies the external device 30 and generates an instruction to transfer data. Then the start-stop synchronization control unit 14 receives data via the bus 21 and main interface unit 11, and converts it into serial start-stop system data. The radio modulator 15 modulates the data from the control unit 14, and transmits a frequency signal via the antenna 21-1.

The radio demodulator 35 of the external device 30 demodulates the frequency signal received via the antenna 31-1. Demodulated start-stop system data is applied to the connector 32 through the driver/receiver 34. In this manner, an external device in conformity to a predetermined interface, such as the RS-232C interface, can be connected to the main body 20 as in the case of a main body having a connector for external connection.

Figure 7A:
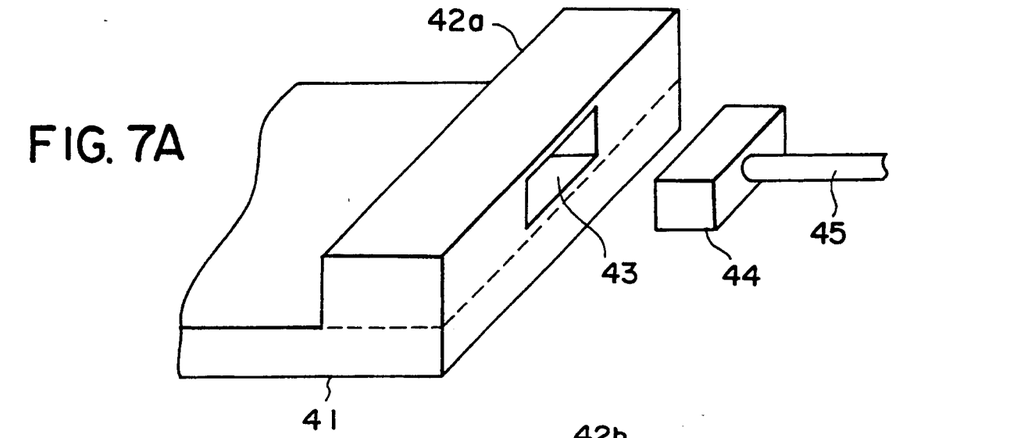
FIG. 7A is a perspective view of a third embodiment of the present invention.
Figure 8:
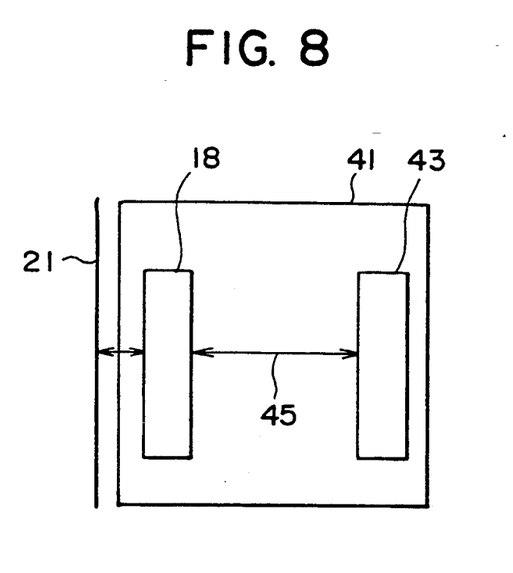
FIG. 8 is a block diagram of the card type input/output interface device of the third embodiment of the present invention.

A description will now be given of a third embodiment of the present invention. A card type input/output interface device 41 has a projection 42a formed in the aforementioned second connection part 2. The projection 42a upwardly projects from a surface of the card. As shown in FIG. 8, the aforementioned connector 18 is formed in the first connection part opposite the projection 42a. The width of the projection 42a in the direction perpendicular to the direction in which the interface device 41 is inserted into the slot 22 of the main body 20 is the same as that of the card 4. A connector 43 is formed in the projection unit 42a so that it accommodates a cable connector 44 of a cable 45 in the direction in which the interface device 41 is inserted into the slot of the main body 20. As shown in FIG. 8, the connector 43 is electrically connected to the connector 18 through a conductive line formed in the card. The projection 42a is located outside the main body 20 when the interface device 41 has been inserted into the main body 20. It is also possible to design the projection 42a so that it is accommodated in the main body 20.

Figure 7B:
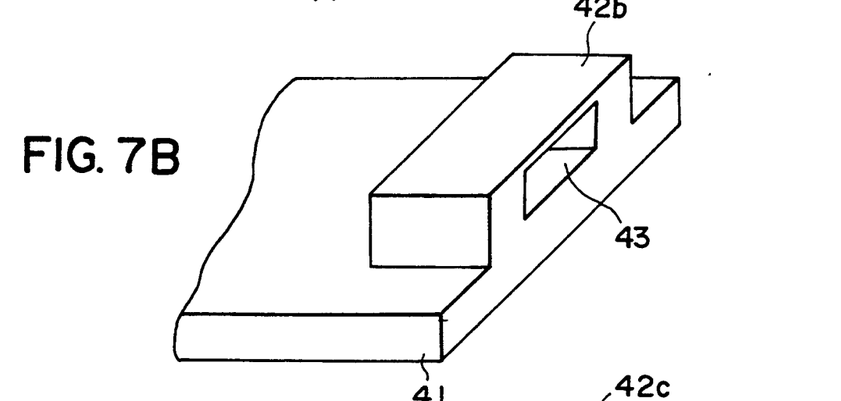
FIG. 7B is a perspective view of a variation of the structure shown in FIG. 7A.

FIG. 7B shows a first variation of the interface device 41, which has a projection 42b. As shown in FIG. 7B, the width of the projection 42b is smaller than that of the card. This means that the projection 42b has a width sufficient to provide the connector 43. It is possible to select the dimensions of the projection 42b so that the projection 42b is housed in the main body 20 when it is inserted into the slot 22.

Figure 7C:
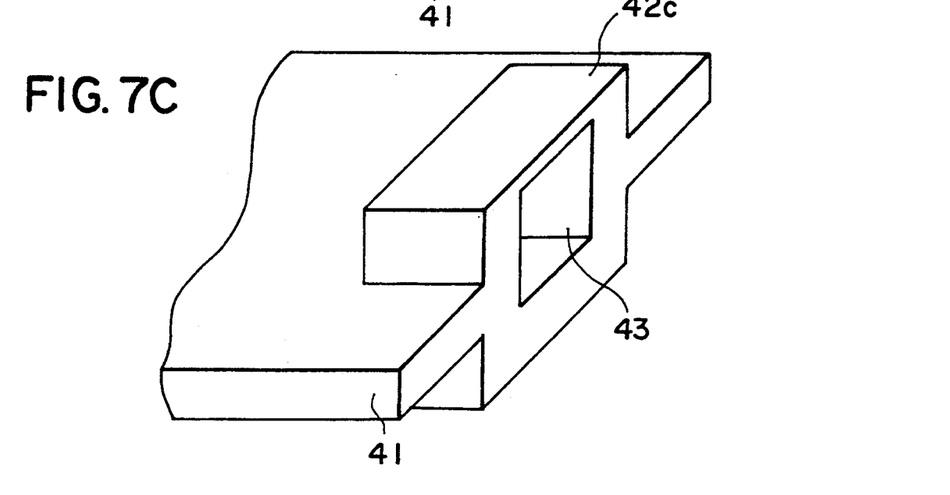
FIG. 7C is a perspective view of a variation of the structure shown in FIG. 7B.

FIG. 7C shows a second variation of the interface device 41 shown in FIG. 7B. The interface device 41 shown in FIG. 7C has a projection 42 which projects from both opposing surfaces of the card. A person can grip the projection 42c from both sides thereof. Hence, it is easy to insert the interface device 41 into the slot 22 and detach it therefrom.

Figure 9A:
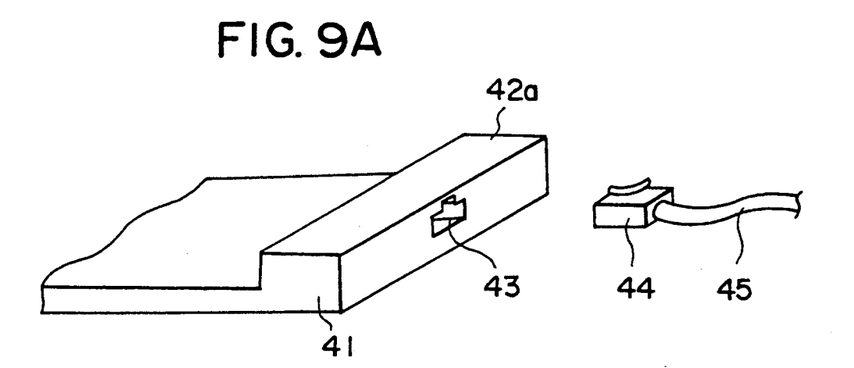
FIGS. 9A through 9C are perspective views of card type input/output interface devices in which 6-pin modular connectors are used.
Figure 9B:
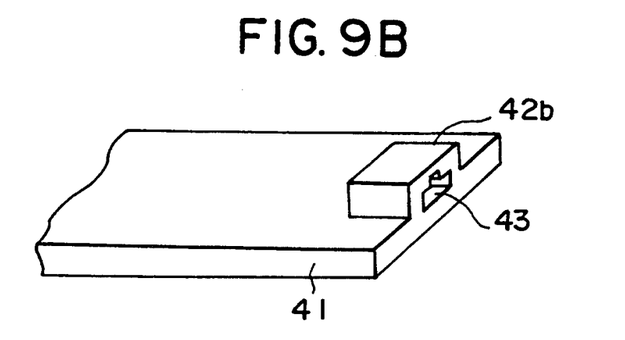
Figure 9C:
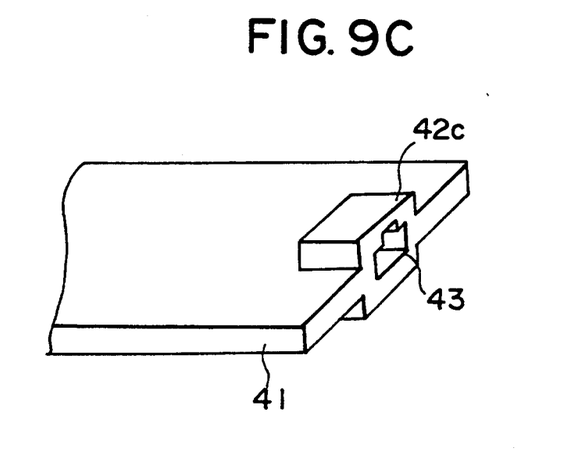

FIGS. 9A, 9B and 9C show the card type input/output interface devices 41 shown in FIGS. 7A, 7B and 7C in which the connectors 43 and 44 are formed with 6-pin modular connectors. It is possible to form the modular 44 so that it is 7 mm×7 mm in length and breadth. When the card is 3 mm thick, the projection 42a is designed to have a thickness of approximately 6 mm. Thus, the total thickness is equal to approximately 9 mm–10 mm. This thickness does not degrade the performance of the IC cards.

Figure 10A:
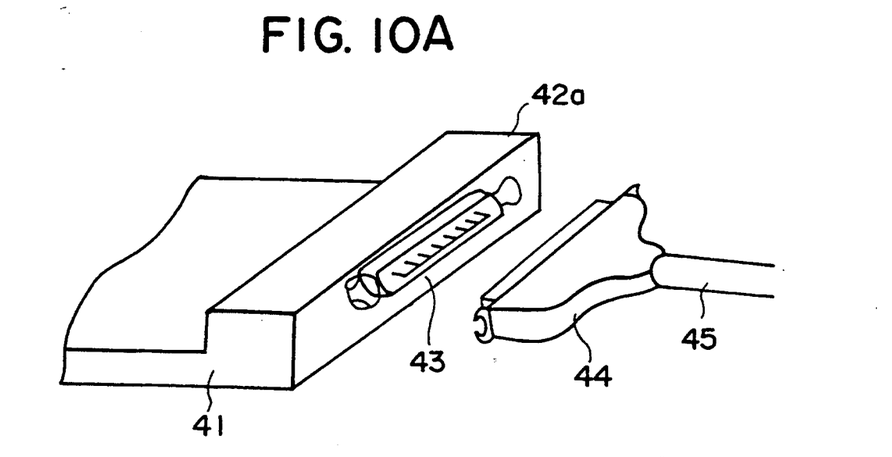
FIGS. 10A through 10C are perspective views of card type input/output interface devices in which Centro-connectors are used.
Figure 10B:
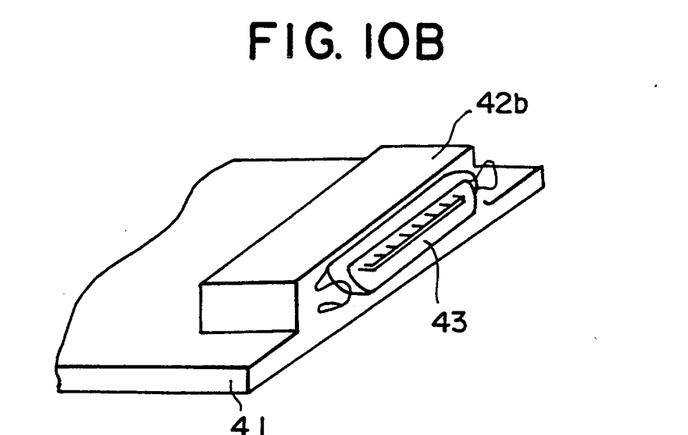
Figure 10C:
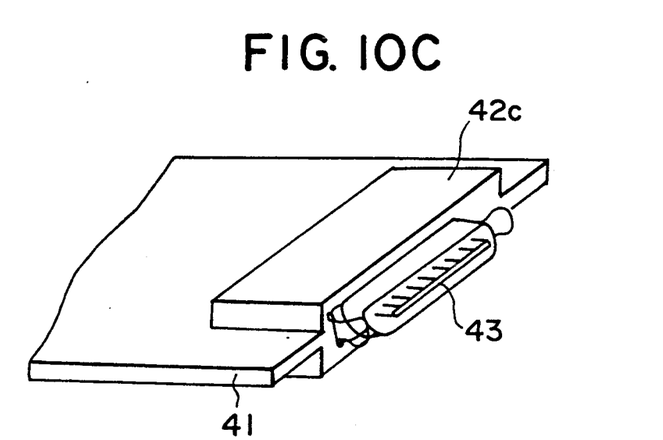

FIGS. 10A, 10B and 10C show the card type input/output interface devices 41 shown in FIGS. 7A, 7B and 7C in which the connectors 43 and 44 are formed with 6-pin Centro-connectors which conform to the Centronics.

Figure 11A:
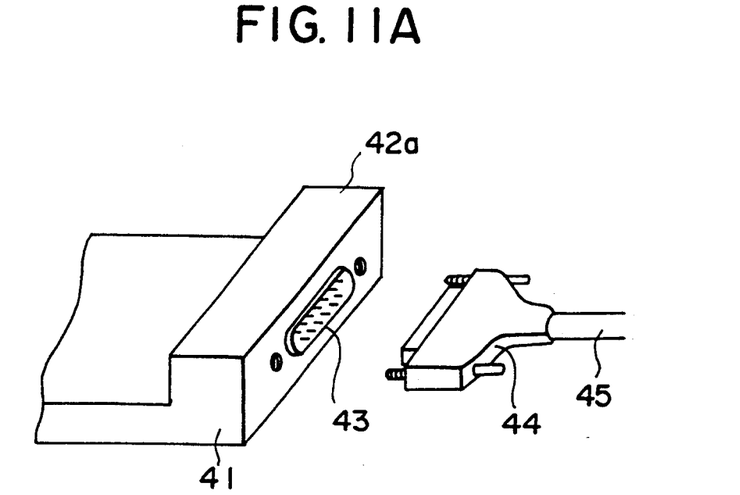
FIGS. 11A through 11C are perspective views of card type input/output interface devices in which RS-232C connectors are used.
Figure 11B:
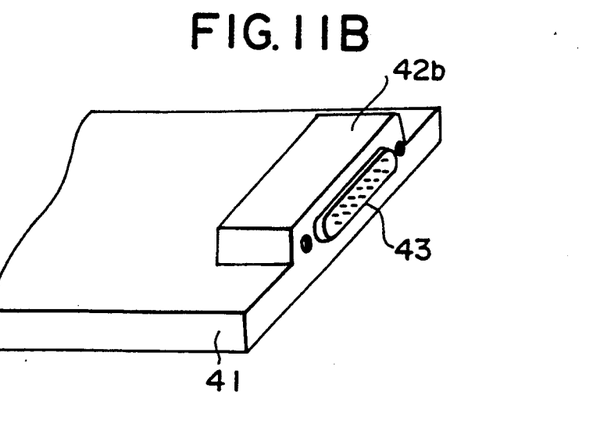
Figure 11C:
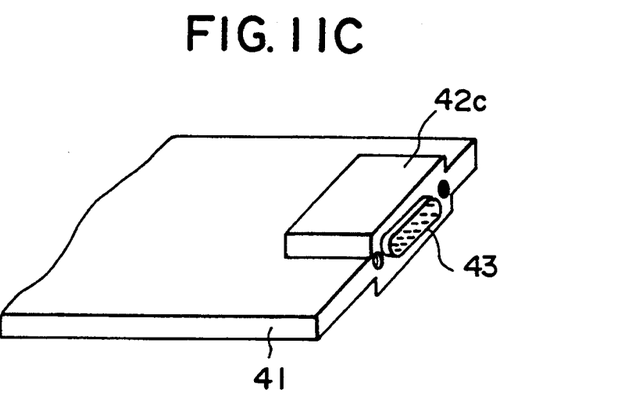

FIGS. 11A, 11B and 11C show the card type input/output interface devices 41 shown in FIGS. 7A, 7B and 7C in which the connectors 43 and 44 are formed with RS-232C connectors which conform to the RS-232C interface.

According to the present invention, the card type input/output interface device that is inserted into the slot of the electronic device systems can be provided. The interface device of the present invention can facilitate down-sizing and cost reducing of the electronic device systems because connectors for external connection can be omitted. Further, it is easy to connect the electronic device systems to various types of interface connectors by providing various types of the interface devices as shown in FIGS. 9A–9C through 11A–11C. This increases the functions of the main body. Furthermore, the use of electronic elements as shown in FIGS. 3A, 3B, 6A and 6B provides various types of interface between the main body and external devices. Particularly, the use of radio transmitter/receiver units can provide the card type input/output interface devices having a thickness almost the same as the thicknesses of conventional IC memory cards and IC cards. It should be noted that the card type input/output interface device is open to the external environment while the conventional cards operate in the closed environment.

In the embodiments described in the foregoing, connections between the main body 20 and the interface device 10 are made by means of the direct-contact structure. Alternatively, it is possible to make these connections by means of a non-contact structure by using, for example, a radio transmitter/receiver unit as in the case of making connections between the interface device 10 and the external device 30.

The present invention is not limited to the specifically disclosed embodiments and variations and modifications may be made without departing from the scope of the present invention.

What is claimed is:

1. A card type input/output interface device comprising:
   first data transmission means for transferring data between a main body of an electronic device and the card type input/output interface device;
   second data transmission means, coupled to said first data transmission means, for transferring data between an external device and the card type input/output interface device; and
   a card supporting said first and second data transmission means,
   said first data transmission means being accommodated in said main body when the card type input/output interface device is inserted into a slot provided in said main body of the electronic device so as to transfer data between said card type input/output interface device and said electronic device.

2. A card type input/output interface device as claimed in claim 1, wherein said second data transmission means comprises radio transmitter/receiver means for transferring the data between said external device and the card type input/output interface device through a radio communications channel.

3. A card type input/output interface device as claimed in claim 2, and further comprising data transfer circuit means, interposed between said first and second data transmission means, for providing an interface of data transfer between said first data transmission means and said radio transmitter/receiver means.

4. A card type input/output interface device as claimed in claim 2, wherein said second data transmission means comprises an antenna coupled to said radio transmitter/reciever means.

5. A card type input/output interface device as claimed in claim 4, wherein said antenna is a rod type antenna.

6. A card type input/output interface device as claimed in claim 4, wherein said antenna is a rod type antenna which is contractible and expandable.

7. A card type input/output interface device as claimed in claim 4, wherein said antenna is a rod type antenna which is contractible and expandable and which is rotatably supported to said card.

8. A card type input/output interface device as claimed in claim 4, wherein said antenna is an edge portion of said card.

9. A card type input/output interface device as claimed in claim 1, wherein:
   said card has a projection in which said second data transmission means is provided;
   said first data transmission means is located in a first end portion of said card and said second data transmission means is located in a second end portion opposite said first end portion; and
   a thickness of said second end portion of said card including said projection is greater than a thickness of said first end portion of said card.

10. A card type input/output interface device as claimed in claim 9, wherein said projection upwardly projects from a surface of said card.

11. A card type input/output interface device as claimed in claim 9, wherein said projection projects upwardly and downwardly projects from opposing surfaces of said card.

12. A card type input/out interface device as claimed in claim 9, wherein:
   said card has a first width in said first end portion;

said projection has a second width in said second end portion; and
said first width is equal to said second width.

13. A card-type input/output interface device as claimed in claim 9, wherein:
said card has a first width in said first end portion;
said projection has a second width in said second end portion; and
said second width is smaller than said first width.

14. A card type input/output interface device as claimed in claim 9, wherein said second data transmission means comprises a connector formed in said projection for electrically connecting the card type input/output interface device to said external device.

15. A card type input/output interface device as claimed in claim 14, wherein said connector is a pin modular connector.

16. A card type input/output interface device as claimed in claim 14, wherein said connector is a Centro-connector.

17. A card type input/output interface device as claimed in claim 14, wherein said connector is an RS-232C connector.

18. A card type input/output interface device as claimed in claim 1, wherein said first data transmission means comprises a connector for electrically connecting said the card type input/output interface device to said electronic device.

19. An electronic device system comprising:
a main body of an electronic device, said main body comprising a slot;
a card type input/output interface device operable to be inserted into said slot; and
an external device,
wherein said card type input/output interface device comprises:
first data transmission means for transferring data between the main body and the card type input/output interface device;
second data transmission means, coupled to said first data transmission means, for transferring data between said external device and said card type input/output interface device; and
a card supporting said first and second data transmission means,
said first data transmission means being accommodated in said main body when said card type input/output interface device is inserted into said slot provided in the main body so as to transfer data between said external device and said card type input/output device and said electronic device, and wherein:
the main body comprises third data transmission means, coupled to said first data transmission means, for coupling the main body and said card type input/output interface device with each other and transferring data therebetween; and
said external device comprises fourth data transmission means, coupled to said second data transmission means, for coupling said card type input/output interface device and said external device with each other and transferring data therebetween.

20. An electronic device system as claimed in claim 19, wherein:
said second data transmission means comprises first radio transmitter/receiver means for transferring the data between said external device and said card type input/output interface device through a radio communications channel; and
said fourth data transmission means comprises second radio transmission/receiver means for transferring the data between said external device and said card type input/output interface device through said radio communications channel.

21. An electronic device system as claimed in claim 19, wherein said card type input/output interface device further comprises data transfer circuit means, interposed between said first and second data transmission means, for providing an interface of data transfer between said first data transmission means and said first radio transmitter/receiver means.

22. An electronic device system as claimed in claim 20, wherein:
said second data transmission means comprises a first antenna coupled to said first radio transmitter/receiver means; and
said fourth data transmission means comprises a second antenna coupled to said second radio transmitter/receiver means.

23. An electronic device system as claimed in claim 22, wherein said first antenna is a rod type antenna.

24. An electronic device system as claimed in claim 22, wherein said first antenna is a rod type antenna which is contractible and expandable.

25. An electronic device system as claimed in claim 22, wherein said first antenna is a rod type antenna which is contractible and expandable and which is rotatably supported to said card.

26. An electronic device system as claimed in claim 22, wherein said first antenna is an edge portion of said card.

27. An electronic device system as claimed in claim 19, wherein:
said card has a projection in which said second data transmission means is provided;
said first data transmission means is located in a first end portion of said card and said second connection means is located in a second end portion opposite said first end portion; and
a thickness of said second end portion of said card including said projection is greater than a thickness of said first end portion of said card.

28. An electronic device system as claimed in claim 27, wherein said projection upwardly projects from a surface of the card.

29. An electronic device system as claimed in claim 27, wherein said projection projects upwardly and downwardly projects from opposing surfaces of said card.

30. An electronic device system as claimed in claim 27, wherein:
said card has a first width in said first end portion;
said projection has a second width in said second end portion; and
said first width is equal to said second width.

31. An electronic device system as claimed in claim 27, wherein:
said card has a first width in said first end portion;
said projection has a second width in said second end portion; and
said second width is smaller than said first width.

32. An electronic device system as claimed in claim 27, wherein said second data transmission means comprises a connector formed in said projection for electrically connecting said card type input/output interface device to said external device.

33. An electronic device system as claimed in claim 32, wherein said connector is a pin modular connector.

34. An electronic device system as claimed in claim 32, wherein said connector is a Centro-connector.

35. An electronic device system as claimed in claim 32, wherein said connector is an RS-232C connector.

36. An electronic device system as claimed in claim 19, wherein said first data transmission means comprises a connector for electrically connecting said card type input/output interface device to said main body.

37. An electronic device system as claimed in claim 20, wherein said external device comprises fifth data transmission means, coupled to said second radio transmitter/receiver means, for coupling said external device to another external device and transferring data therebetween.

* * * * *